United States Patent
Wright et al.

(10) Patent No.: US 10,863,807 B1
(45) Date of Patent: Dec. 15, 2020

(54) WATERPROOF SLEEVE FOR ELECTRONIC DEVICE

(71) Applicant: CATALYST LIFESTYLE LIMITED, North Point (HK)

(72) Inventors: Joshua Wright, Hong Kong (CN); June Lai, Hong Kong (CN)

(73) Assignee: CATALYST LIFESTYLE LIMITED, North Point (HK)

( * ) Notice: Subject to any disclaimer, the term of this patent is extended or adjusted under 35 U.S.C. 154(b) by 0 days.

(21) Appl. No.: 16/458,476

(22) Filed: Jul. 1, 2019

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01)

(58) Field of Classification Search
CPC ..... A45C 11/00; H04B 1/3888; H04M 1/185; H04R 1/1025
See application file for complete search history.

(56) References Cited

U.S. PATENT DOCUMENTS

| | | | |
|---|---|---|---|
| D393,148 S | 4/1998 | Petruzzi | |
| D399,604 S | 10/1998 | Wolff | |
| 6,068,119 A * | 5/2000 | Derr | G01D 11/24 206/305 |
| D467,799 S | 12/2002 | Persson | |
| 6,659,274 B2 * | 12/2003 | Enners | G06F 1/1626 206/305 |
| 7,347,325 B2 | 3/2008 | O'Neil et al. | |
| D592,400 S | 5/2009 | Nelson | |
| D594,659 S | 6/2009 | Lown et al. | |
| D620,259 S | 6/2010 | Fahrendorff et al. | |
| 7,775,354 B2 * | 8/2010 | Latchford | A45C 11/00 150/165 |
| D666,824 S | 9/2012 | Phillips et al. | |
| D670,497 S | 11/2012 | Phillips et al. | |
| D672,642 S | 12/2012 | Supranowicz | |
| 8,399,764 B2 | 3/2013 | Klosky | |
| 8,644,011 B2 * | 2/2014 | Parkinson | G06F 1/1626 455/575.1 |

(Continued)

FOREIGN PATENT DOCUMENTS

| | | |
|---|---|---|
| CN | 304342633 S | 11/2017 |
| CN | 206744792 U | 12/2017 |

(Continued)

OTHER PUBLICATIONS

Kim1991tae. "AirPod Case Catalyst." Naver, Aug. 9, 2017. Web. https://blog.naver.com/kim1991tae/221070237784.

(Continued)

*Primary Examiner* — Bryon P Gehman
(74) *Attorney, Agent, or Firm* — Dipsmore & Shohl LLP

(57) ABSTRACT

A water proof sleeve for an electronic device includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs.

20 Claims, 5 Drawing Sheets

(56) References Cited

U.S. PATENT DOCUMENTS

| | | | |
|---|---|---|---|
| 9,090,385 B2* | 7/2015 | Blagojevic | F42B 39/26 |
| D794,617 S | 8/2017 | Wright et al. | |
| D794,618 S | 8/2017 | Wright et al. | |
| 9,733,054 B2* | 8/2017 | Blagojevic | F42B 39/26 |
| D806,388 S | 1/2018 | Akana et al. | |
| D808,791 S | 1/2018 | Johnston et al. | |
| D818,268 S | 5/2018 | Akana et al. | |
| D846,264 S | 4/2019 | Wu | |
| D849,401 S | 5/2019 | Akana et al. | |
| D872,094 S | 1/2020 | Wright et al. | |
| D872,723 S | 1/2020 | Lee et al. | |
| D872,724 S | 1/2020 | Lee et al. | |
| D881,181 S | 4/2020 | Wright et al. | |
| D886,453 S | 6/2020 | Wright et al. | |
| 2007/0261978 A1* | 11/2007 | Sanderson | A45C 11/22 206/320 |
| 2011/0017620 A1* | 1/2011 | Latchford | A45C 13/008 206/320 |
| 2015/0014367 A1* | 1/2015 | VanSyckel | B65D 47/121 222/399 |

FOREIGN PATENT DOCUMENTS

| | | |
|---|---|---|
| CN | 208581338 U | 3/2019 |
| CN | 208939608 U | 6/2019 |
| DE | 202018105634 U1 | 11/2018 |
| DE | 202018105634 U1 | 12/2018 |
| KR | 20130028536 A | 3/2013 |
| KR | 200488427 Y1 | 1/2019 |
| KR | 200488427 Y1 | 1/2019 |

OTHER PUBLICATIONS

This glow-in-the-dark,waterproof AirPods case—Catalist AirPods Case, publication date Apr. 14, 2017, [online][site visited Sep. 9, 2019] URL:https://www.theverge.com/circuitbreaker/2017/4/14/15306100/catalyst-case-airpods-sale-glow-in-the-dark (Year: 2017).

* cited by examiner

WATERPROOF SLEEVE FOR ELECTRONIC DEVICE

FIELD OF THE INVENTION

The instant application is directed to a sleeve for an electronic device.

BACKGROUND OF THE INVENTION

Waterproof housings for various devices are known in the art. However such water proof housings are not specifically designed for water proof sealing and folding to allow access to the electronic device. There is therefore a need in the art for a water tight sleeve that has an improved sealing and allows a user to fold the case to access device while positioned within the sleeve.

SUMMARY OF THE INVENTION

In one aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs.

In another aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs. The water sealing rib includes a compound curve.

In another aspect, there is disclosed a water proof sleeve for an electronic device that includes an elastic body including an open top and a curved side wall joined to a bottom wall. The curved side wall and bottom wall define an internal cavity receiving an electronic device. A plurality of separated sealing ribs are formed on an internal surface of the side wall. The plurality of sealing ribs are formed circumferentially about the side wall. One of the plurality of sealing ribs is a water sealing rib and includes a radial dimension that is at least twice the size in comparison to the other sealing ribs of the plurality of sealing ribs. The water sealing rib includes a compound curve that seals to a curved surface of the electronic device.

Additional features and advantages of the water proof sleeve described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

DETAILED DESCRIPTION OF THE EMBODIMENTS

Figure 1:
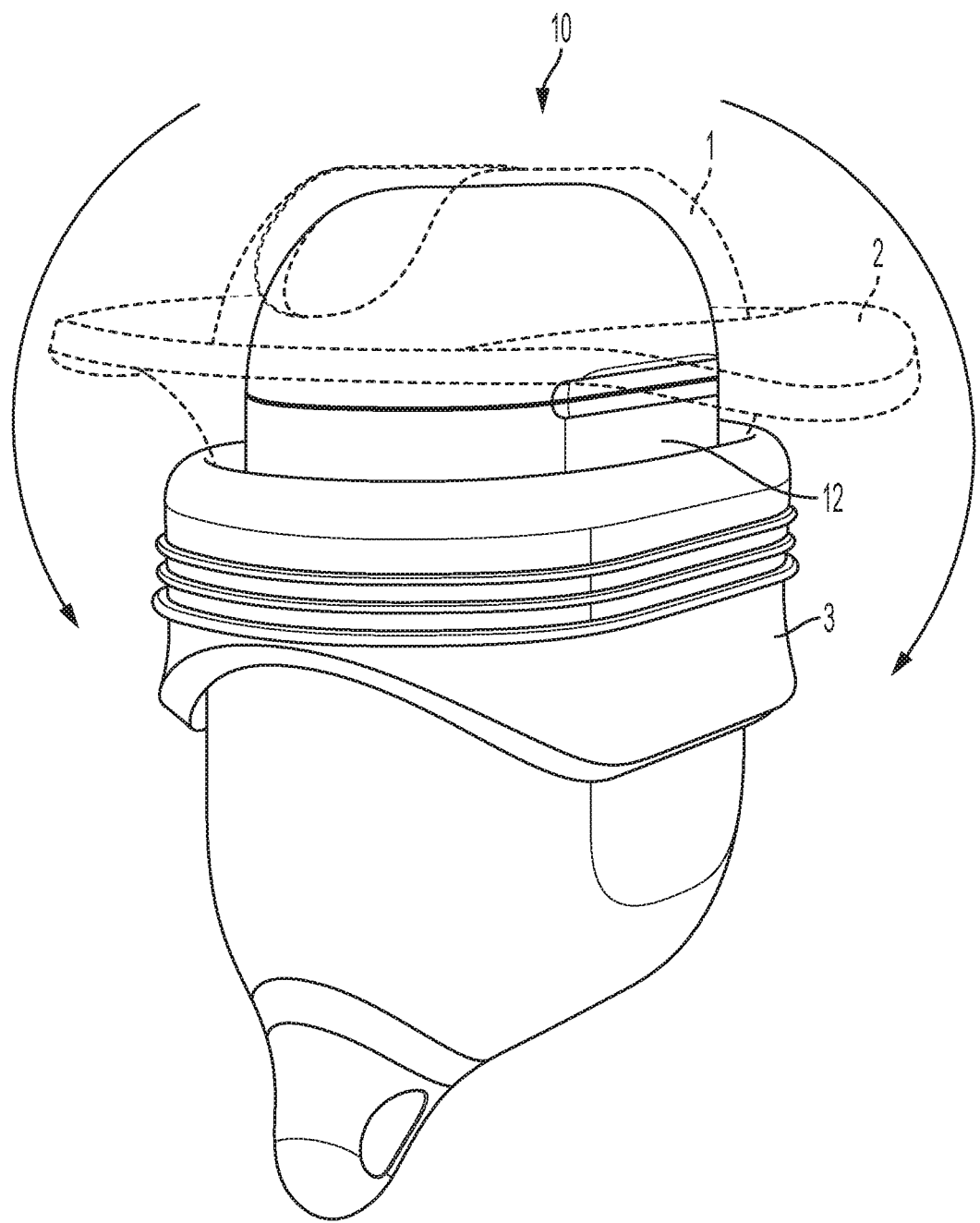
FIG. 1 is a perspective view detailing positions of the Sleeve for Electronic Device.
Figure 2:
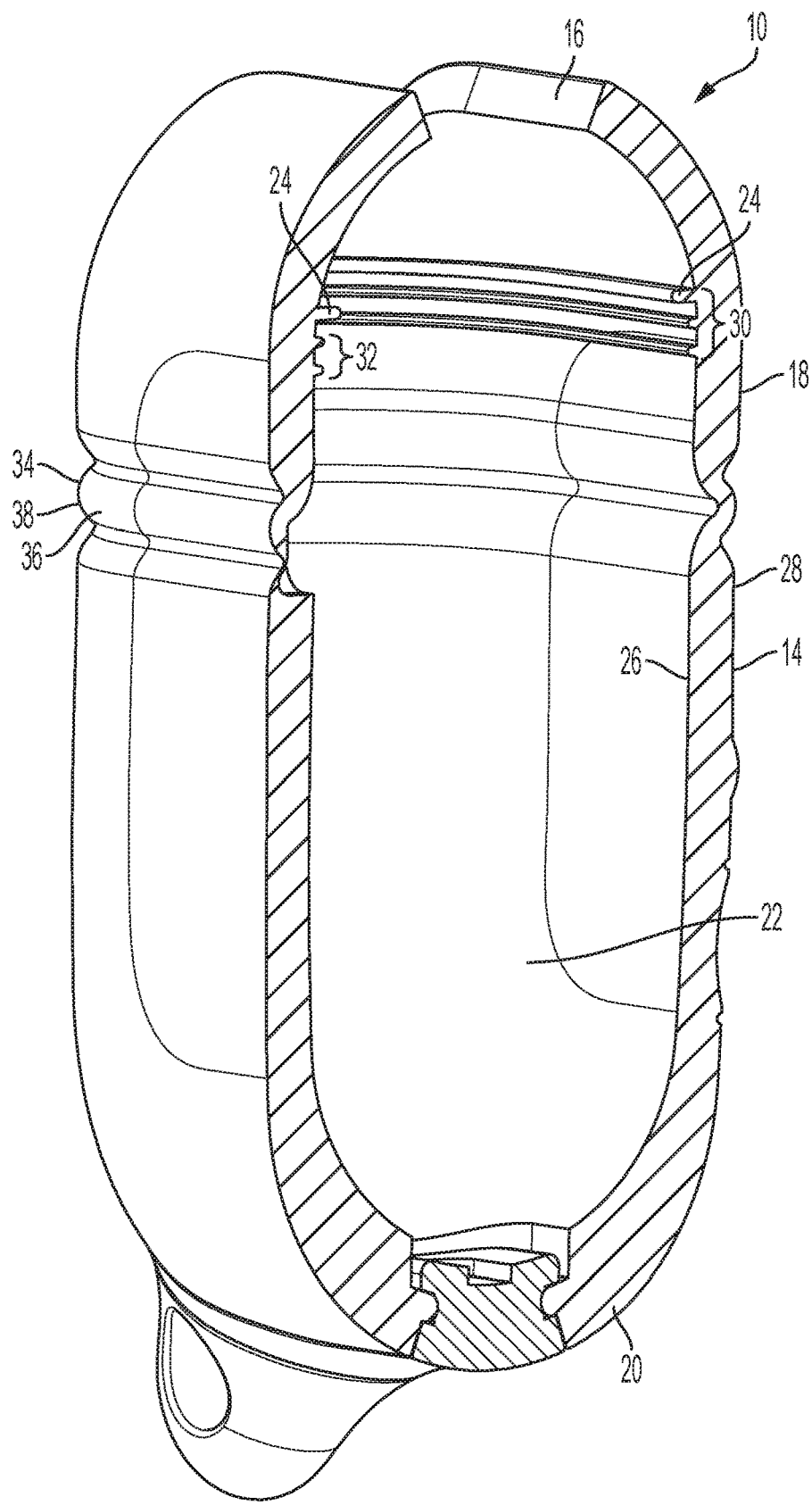
FIG. 2 is a partial perspective sectional view of the Sleeve for Electronic Device.
Figure 3:
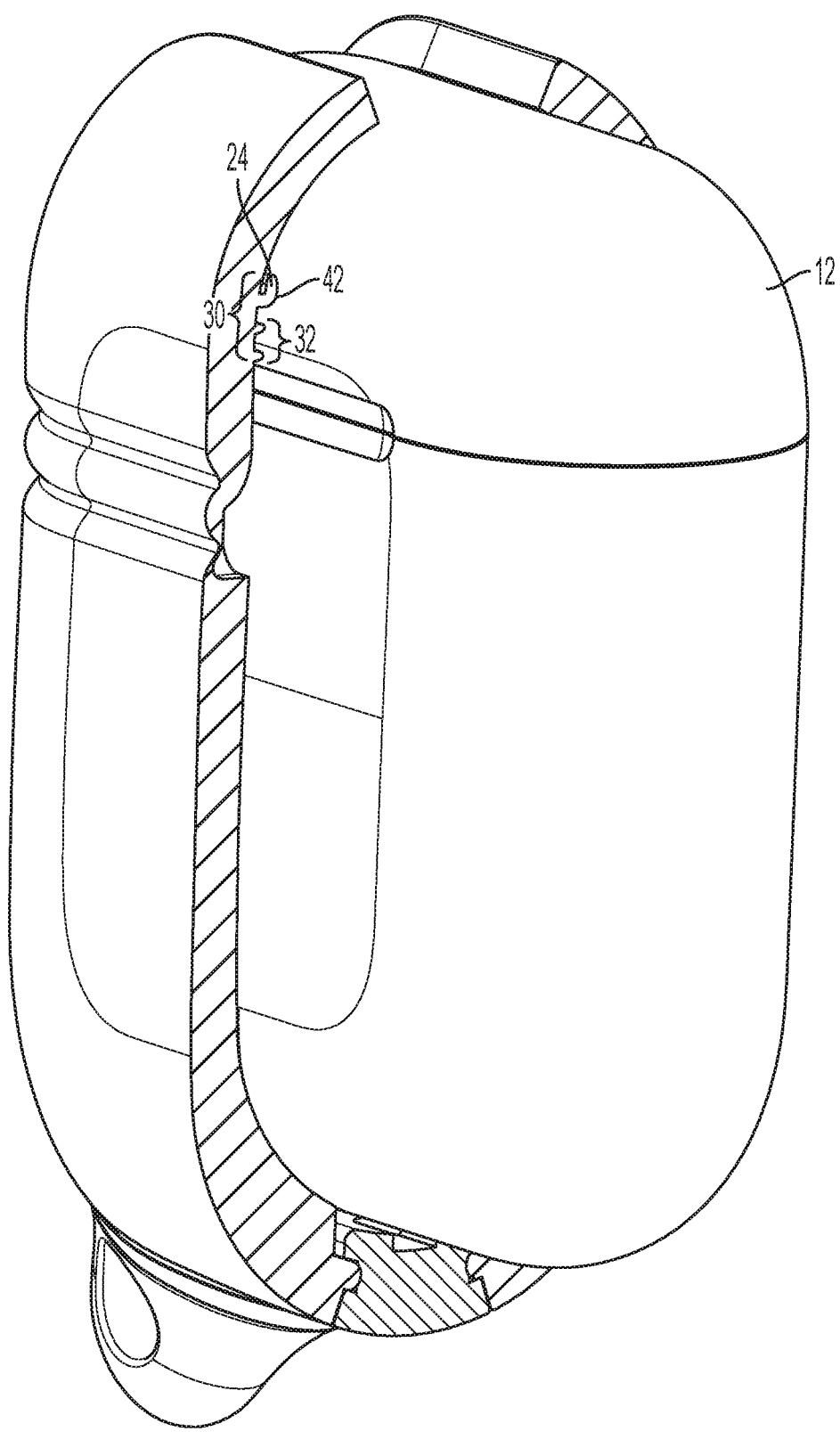
FIG. 3 is a partial perspective sectional view of the Sleeve and Electronic Device.
Figure 4:
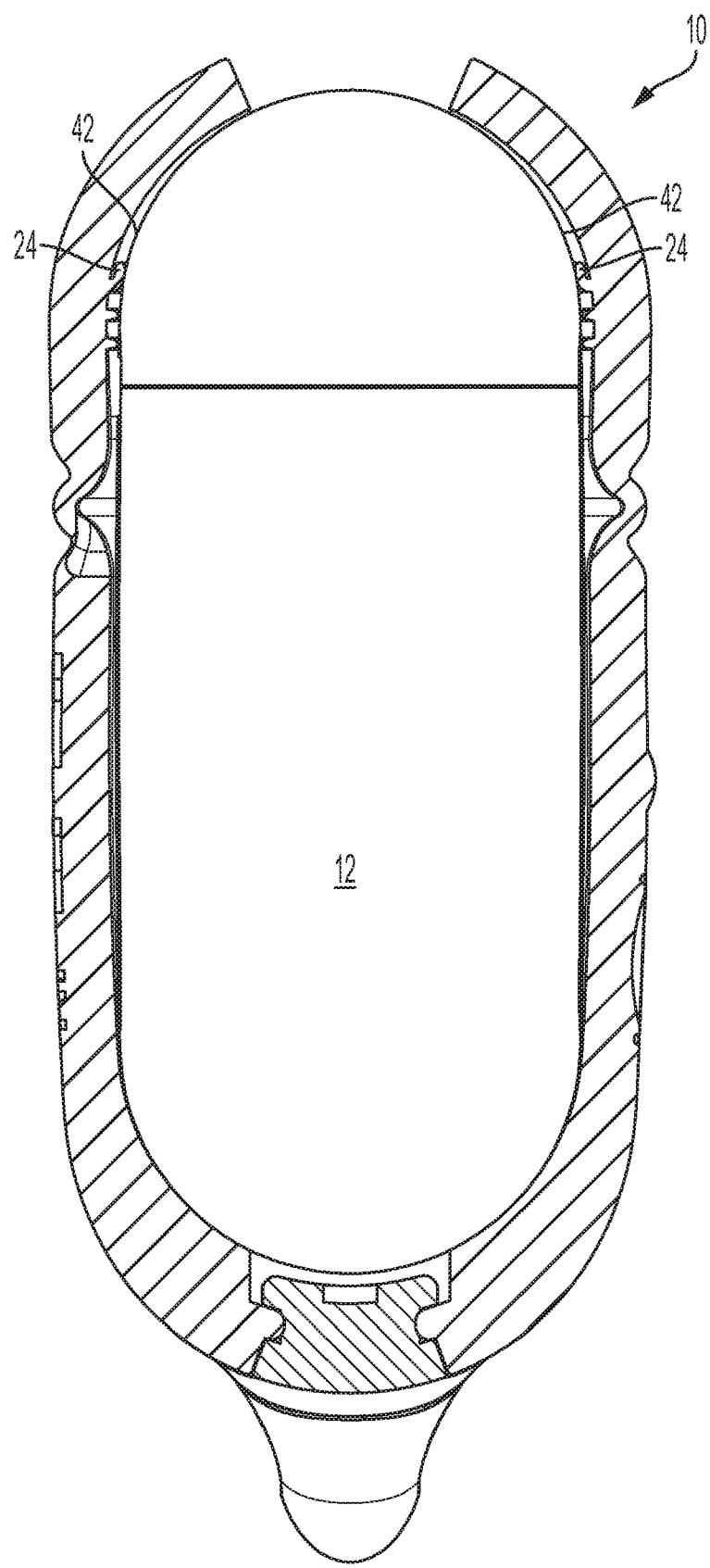
FIG. 4 is a side sectional view of the Sleeve and Electronic Device.

Referring to FIGS. 1-5, there is shown a water proof sleeve 10 for an electronic device 12. The water proof sleeve 10 includes an elastic body 14 including an open top 16 and a curved side wall 18 joined to a bottom wall 20. The curved side wall 18 and bottom wall 20 define an internal cavity 22 receiving the electronic device 12. In one aspect, the elastic body 14 may be formed of a high tensile strength silicone material. The high tensile strength silicone retains its elastic property and applies a biasing force to a water sealing rib 24 to maintain a seal with the electronic device 12 as will be discussed in more detail below.

The side wall 18 includes separated inner and outer surfaces 26, 28. The inner surface 26 includes a plurality of separated sealing ribs 30 formed thereon. The plurality of sealing ribs 30 is formed circumferentially about the side wall 18 and extends radially inward toward the electronic device 12. One of the plurality of ribs 30 is a water sealing rib 24 and includes a radial dimension that is greater than in comparison to the other sealing ribs 32 of the plurality of sealing ribs 30. In one aspect, the water sealing rib 24 includes a radial dimension that is at least twice the size in comparison to the other sealing ribs 32 of the plurality of sealing ribs 30.

The side wall 18 includes a fold partition 34 formed therein. The fold partition 34 includes a trough 36 formed therein that extends from the inner surface 26 toward the outer surface 28. The trough 36 defines a fold line 38 which allows the sleeve 10 to be moved between open and closed positions as will be discussed in more detail below.

In the depicted embodiments, the plurality of sealing ribs 30 are formed proximate the open top 16. In one aspect, the water sealing rib 24 is positioned closer to the open top 16 relative to the other of the plurality of ribs 30. The other of the plurality of ribs 30 may act as dust ribs 32 as will be discussed in more detail below.

Figure 5:
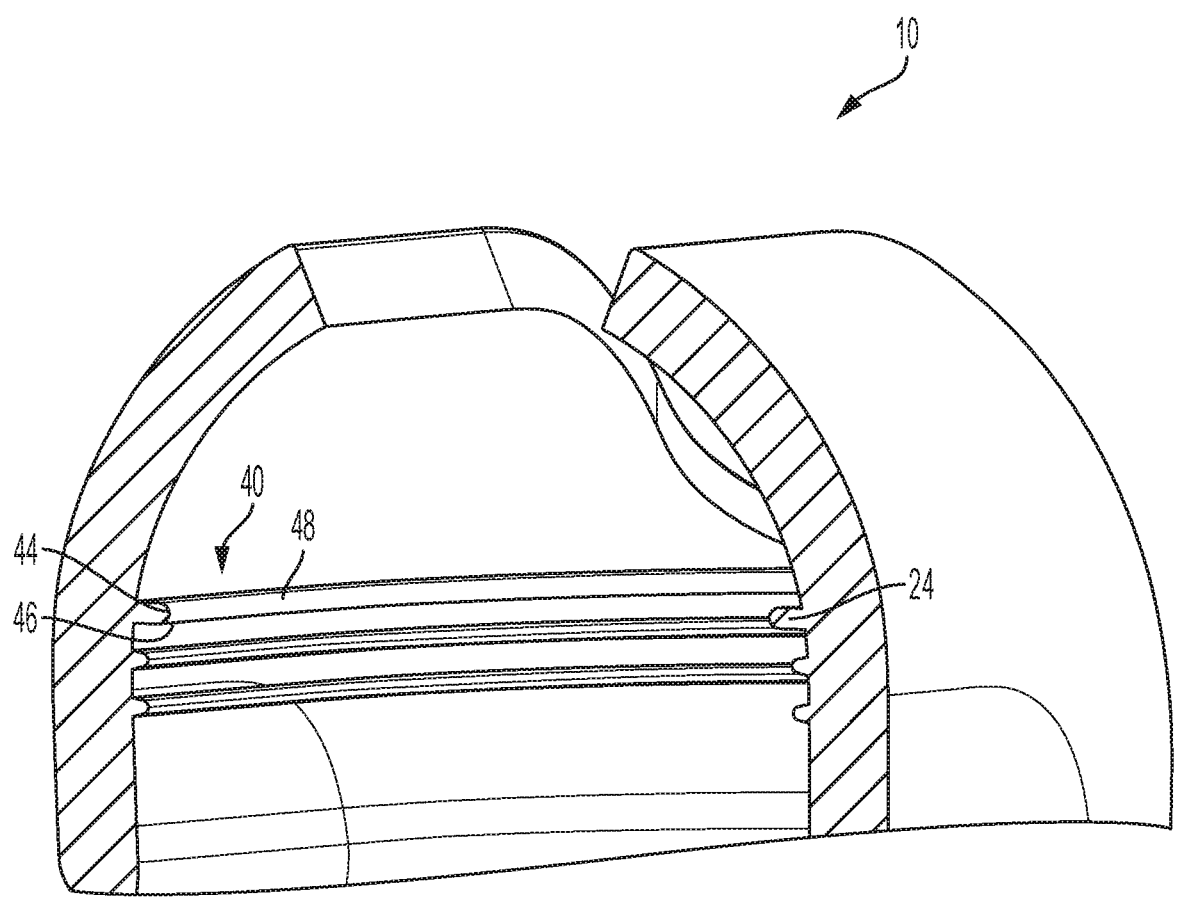
FIG. 5 is a partial perspective sectional view of the Sleeve showing the water sealing rib.

Referring to FIG. 5, the water sealing rib 24 includes a compound curve 40. The compounds curve 40 seals to a curved surface 42 of the electronic device 12.

The compound curve 40 includes a first radius and a second radius 44, 46. The first radius 44 is larger than the second radius 46 and seals to the curved surface 42 of the electronic device 12. The first and second radii 44, 46 converge to a tip portion 48 to prevent ingress of water.

In use, the electronic device 12 may be positioned through the open top 16 and then within the internal cavity 22 defined by the side wall 18 and bottom wall 20. The sleeve 10 may be moved between the open position shown in FIG. 1 (labeled as position 3) where a user may have access to the electronic device 12 and the closed position shown in FIG. 1 labeled as position 1. In the open position, the sleeve 10 is folded about the fold line 38 to allow access to the electronic device 12.

In the closed position, the water sealing rib 24 flexes due to an elastic force applied by the silicone material of the sleeve 10. The flexed water sealing rib 24 includes the compound curve 40 which contacts the curved surface 42 of the electronic device 12 providing a robust water proof seal.

The single water sealing rib 24 having a radial dimension at least twice that of the other ribs 32 provides an improved seal in comparison to a plurality of sealing ribs having the same radial dimension. The single water sealing rib 24 results in a focusing of the elastic force of the sleeve to a single rib as opposed to a distribution of the force over multiple ribs if all the sealing ribs were of the same size.

We claim:

1. A water proof sleeve for an electronic device comprising:
   an elastic body including an open top and a curved side wall joined to a bottom wall, the curved side wall and bottom wall defining an internal cavity receiving an electronic device; and
   a plurality of separated sealing ribs formed on an internal surface of the side wall, the plurality of sealing ribs formed circumferentially about the side wall;
   wherein one of the plurality of sealing ribs is a water sealing rib comprising a first rib edge and an opposite second rib edge, the water sealing rib having a compound curve whereby the first rib edge curves at a first radius and the second rib edge curves at a second radius, the first radius being larger than the second radius.

2. The water proof sleeve for an electronic device of claim 1 wherein the water sealing rib includes a radial dimension that is at least twice the size in comparison to the other sealing ribs of the plurality of sealing ribs.

3. The water proof sleeve for an electronic device of claim 1 wherein the sealing ribs are formed proximate the open top.

4. The water proof sleeve for an electronic device of claim 1 wherein the compound curve causes the water sealing rib to seal to a curved surface of the electronic device.

5. The water proof sleeve for an electronic device of claim 1 wherein the water sealing rib is positioned closer to the open top relative to the other of the plurality of ribs.

6. The water proof sleeve for an electronic device of claim 1 wherein the plurality of ribs includes the water sealing rib and two dust ribs.

7. The water proof sleeve of claim 1, wherein the first radius and the second radius are such that the water sealing rib flexes toward the open top due to an elastic force applied by the elastic body on a curved surface of the electronic device when the waterproof sleeve is in a closed position.

8. The water proof sleeve of claim 1, wherein the first rib edge of the water sealing rib is positioned closer to the open top relative to the second rib edge of the water sealing rib.

9. The water proof sleeve of claim 1, wherein the first rib edge and the second rib edge converge at a tip portion.

10. The water proof sleeve of claim 1, wherein the internal surface of the curved side wall comprises a radius at an interface of the water sealing rib with the internal surface of the curved side wall, and wherein the first rib edge and the second rib edge each extend inwardly toward the internal cavity from the interface.

11. A water proof sleeve for an electronic device comprising:
    an elastic body including an open top and a curved side wall joined to a bottom wall, the curved side wall and bottom wall defining an internal cavity receiving an electronic device; and
    a plurality of separated sealing ribs formed on an internal surface of the side wall, the plurality of sealing ribs formed circumferentially about the side wall;
    wherein one of the plurality of sealing ribs is a water sealing rib and includes a radial dimension that is at least twice the size in comparison to the other sealing ribs of the plurality of sealing ribs, the water sealing rib comprising a first rib edge and a second rib edge, the first rib edge positioned closer to the open top relative to the second rib edge, the water sealing rib having a compound curve whereby the first rib edge curves at a first radius and the second rib edge curves at a second radius, the first radius being larger than the second radius.

12. The water proof sleeve for an electronic device of claim 11 wherein the sealing ribs are formed proximate the open top.

13. The water proof sleeve for an electronic device of claim 11 wherein the compound curve causes the water sealing rib to seal to a curved surface of the electronic device.

14. The water proof sleeve for an electronic device of claim 11 wherein the water sealing rib is positioned closer to the open top relative to the other of the plurality of ribs.

15. The water proof sleeve for an electronic device of claim 11 wherein the plurality of ribs includes the water sealing rib and two dust ribs.

16. The water proof sleeve of claim 11, wherein the internal surface of the curved side wall comprises a radius at an interface of the water sealing rib with the internal surface of the curved side wall, and wherein the first rib edge and the second rib edge each extend inwardly toward the internal cavity from the interface.

17. A water proof sleeve for an electronic device comprising:
    an elastic body including an open top and a curved side wall joined to a bottom wall, the curved side wall and bottom wall defining an internal cavity receiving an electronic device; and
    a plurality of separated sealing ribs formed on an internal surface of the side wall, the plurality of sealing ribs formed circumferentially about the side wall;
    wherein one of the plurality of sealing ribs is a water sealing rib and includes a radial dimension that is at least twice the size in comparison to the other sealing ribs of the plurality of sealing ribs, the water sealing rib comprising a first rib edge and a second rib edge that converge at a tip portion, the first rib edge positioned closer to the open top relative to the second rib edge, the water sealing rib having a compound curve whereby the first rib edge curves at a first radius and the second rib edge curves at a second radius, the first radius being larger than the second radius such that the water sealing rib flexes toward the open top due to an elastic force applied by the elastic body on a curved surface of the electronic device when the waterproof sleeve is in a closed position.

18. The water proof sleeve for an electronic device of claim 17 wherein the sealing ribs are formed proximate the open top.

19. The water proof sleeve for an electronic device of claim 17 wherein the water sealing rib is positioned closer to the open top relative to the other of the plurality of ribs.

20. The water proof sleeve for an electronic device of claim 17 wherein the plurality of ribs includes the water sealing rib and two dust ribs.

* * * * *

UNITED STATES PATENT AND TRADEMARK OFFICE
CERTIFICATE OF CORRECTION

| | | |
|---|---|---|
| PATENT NO. | : 10,863,807 B1 | Page 1 of 1 |
| APPLICATION NO. | : 16/458476 | |
| DATED | : December 15, 2020 | |
| INVENTOR(S) | : Joshua Wright et al. | |

It is certified that error appears in the above-identified patent and that said Letters Patent is hereby corrected as shown below:

On the Title Page

Item (54), Title, delete "WATERPROOF SLEEVE FOR ELECTRONIC DEVICE" and insert --SLEEVE FOR ELECTRONIC DEVICE--, therefor.

In the Specification

In Column 1, Line 1, delete "WATERPROOF SLEEVE FOR ELECTRONIC" and insert --SLEEVE FOR ELECTRONIC--, therefor.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*